US012283241B2

(12) United States Patent
Wang et al.

(10) Patent No.: US 12,283,241 B2

(45) Date of Patent: Apr. 22, 2025

(54) PIXEL DRIVING CIRCUIT, DRIVING METHOD THEREOF, AND DISPLAY PANEL

(71) Applicant: WUHAN CHINA STAR OPTOELECTRONICS SEMICONDUCTOR DISPLAY TECHNOLOGY CO., LTD., Hubei (CN)

(72) Inventors: Xuanyun Wang, Hubei (CN); Chao Dai, Hubei (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 18/476,315

(22) Filed: Sep. 28, 2023

(65) Prior Publication Data

US 2024/0021159 A1 Jan. 18, 2024

Related U.S. Application Data

(63) Continuation-in-part of application No. 17/267,010, filed as application No. PCT/CN2020/114218 on Sep. 9, 2020, now Pat. No. 11,804,177.

(30) Foreign Application Priority Data

Jul. 24, 2020 (CN) ......................... 202010724888.9
Jul. 30, 2020 (CN) ......................... 202010752675.7

(51) Int. Cl.

| | |
|---|---|
| ***G09G 3/3233*** | (2016.01) |
| ***G09G 3/3258*** | (2016.01) |
| ***G09G 3/3266*** | (2016.01) |

(52) U.S. Cl.

CPC ......... *G09G 3/3233* (2013.01); *G09G 3/3258* (2013.01); *G09G 3/3266* (2013.01);

(Continued)

(58) Field of Classification Search

CPC .. G09G 3/3233; G09G 3/3258; G09G 3/3266; G09G 2300/0426;

(Continued)

(56) References Cited

U.S. PATENT DOCUMENTS 11,527,203 B2 * 12/2022 Dong .................. G09G 3/3258
2017/0178569 A1 6/2017 Hu (Continued)

FOREIGN PATENT DOCUMENTS

CN 105225636 A 1/2016
CN 106097964 A 11/2016

(Continued)

OTHER PUBLICATIONS

International Search Report in International application No. PCT/CN2020/114218,mailed on Apr. 28, 2021.

(Continued)

*Primary Examiner* — Jeff Piziali

(74) *Attorney, Agent, or Firm* — PV IP PC; Wei Te Chung

(57) ABSTRACT

The present disclosure provides a pixel driving circuit, a driving method thereof, and a display panel. The pixel driving circuit includes a driving transistor; a compensation module including a first transistor, a compensation transistor for compensating a threshold voltage of the driving transistor, a second transistor, and a storage capacitor connected in series between a source or a drain of the compensation transistor and a gate of the driving transistor; and a data writing module including a data writing transistor connected to an upper plate of the storage capacitor, to improve display effect.

13 Claims, 9 Drawing Sheets

(52) U.S. Cl.
CPC ............... *G09G 2300/0426* (2013.01); *G09G 2300/043* (2013.01); *G09G 2300/0842* (2013.01); *G09G 2310/0243* (2013.01); *G09G 2310/08* (2013.01); *G09G 2320/0233* (2013.01)

(58) Field of Classification Search
CPC ..... G09G 2300/043; G09G 2300/0842; G09G 2310/0243; G09G 2310/08; G09G 2320/0233; G09G 2300/0819; G09G 2300/0861; G09G 2310/0251; G09G 2320/0247
See application file for complete search history.

(56) References Cited

U.S. PATENT DOCUMENTS

| | | | | |
|---|---|---|---|---|
| 2017/0270860 | A1* | 9/2017 | Wang | G09G 3/3258 |
| 2018/0315374 | A1* | 11/2018 | Zhang | G09G 3/3208 |
| 2019/0012948 | A1* | 1/2019 | Ohara | G09G 3/3258 |
| 2019/0019452 | A1 | 1/2019 | Zhu et al. | |
| 2020/0226978 | A1* | 7/2020 | Lin | H01L 29/7869 |
| 2022/0399423 | A1* | 12/2022 | Du | H10K 59/122 |

FOREIGN PATENT DOCUMENTS

| | | | |
|---|---|---|---|
| CN | 109523953 | A | 3/2019 |
| CN | 109961738 | A | 7/2019 |
| CN | 111048041 | A | 4/2020 |
| CN | 111063304 | A | 4/2020 |
| CN | 111261109 | A | 6/2020 |
| CN | 111354307 | A | 6/2020 |
| CN | 212624745 | U | 2/2021 |
| KR | 20180128122 | A | 12/2018 |

OTHER PUBLICATIONS

Written Opinion of the International Search Authority in International application No. PCT/CN2020/114218,mailed on Apr. 28, 2021.
Chinese Office Action issued in corresponding Chinese Patent Application No. 202010752675.7 dated May 1, 2024, pp. 1-6.

* cited by examiner

PIXEL DRIVING CIRCUIT, DRIVING METHOD THEREOF, AND DISPLAY PANEL

FIELD OF INVENTION

The present disclosure relates to the field of display technology, and more particularly to a pixel driving circuit, a driving method thereof, and a display panel.

BACKGROUND OF INVENTION

Low-temperature polysilicon technology is widely used in display devices. However, because polysilicon has grain boundaries and a large number of boundary defect states, threshold voltages of each transistor are different, and a value of the threshold voltage of the transistor under influence of long-term gate bias voltage will shift, causing a display screen to have problems such as uneven display brightness, flickering, and other issues, which affect display quality.

SUMMARY OF INVENTION

The embodiments of the present disclosure provide a pixel driving circuit, a driving method thereof, and a display panel, which can compensate the threshold voltage of the driving transistor and improve the display effect of the display panel.

The present disclosure provides a pixel driving circuit, including a light-emitting device, a driving transistor, a compensation module, and a data writing module, wherein the driving transistor is configured to provide a driving current to the light-emitting device, and the compensation module at least includes: a storage capacitor configured to maintain a gate voltage of the driving transistor; a first transistor, wherein one of a source or a drain of the first transistor is connected to a gate of the driving transistor, and the first transistor is configured to transmit a first reset signal to the gate of the driving transistor; a second transistor configured to transmit a second reset signal to one of a source or a drain of the driving transistor; and a compensation transistor, wherein the storage capacitor is connected in series between one of a source or a drain of the compensation transistor and the gate of the driving transistor, another one of the source or the drain of the compensation transistor is connected to one of the source or the drain of the driving transistor, and the compensation transistor accompanying with the second transistor and the storage capacitor is configured to compensate a threshold voltage of the driving transistor; wherein the data writing module at least includes a data writing transistor, one of a source or a drain of the data writing transistor is connected to an upper plate of the storage capacitor, and the data writing transistor is configured to write a data signal into the storage capacitor and to transmit the data signal to the gate of the driving transistor.

The present disclosure also provides a driving method of a pixel driving circuit for driving the pixel driving circuit, in an Nth frame period, the driving method including: in an initialization phase, transmitting the first reset signal to the gate of the driving transistor by the first transistor of the compensation module to initialize the gate voltage of the driving transistor, and compensating the threshold voltage of the driving transistor by the second transistor, the compensation transistor, and the storage capacitor; and in a data writing phase, writing the data signal to the storage capacitor and transmitting the data signal to the gate of the driving transistor by the storage capacitor.

The present disclosure further provides a display panel, including a pixel driving circuit, wherein the pixel driving circuit includes: a storage capacitor; a light-emitting device, wherein a cathode of the light-emitting device is connected to a first voltage terminal; a first transistor, wherein a gate of the first transistor is connected to a first scan signal line, one of a source or a drain of the first transistor is connected to a first reset signal line, and another one of the source or the drain of the first transistor is connected to a gate of an eighth transistor; a second transistor, wherein a gate of the second transistor is connected to the first scan signal line, and one of a source or a drain of the second transistor is connected to a second reset signal line; a third transistor, wherein a gate of the third transistor is connected to the first scan signal line, the storage capacitor is connected in series between one of a source or a drain of the third transistor and the gate of the eighth transistor, and another one of the source or the drain of the third transistor is connected to one of a source or a drain of the eighth transistor; and a fourth transistor, wherein a gate of the fourth transistor is connected to a second scan signal line, one of a source or a drain of the fourth transistor is connected to a data signal line, and another one of the source or the drain of the fourth transistor is connected to an upper plate of the storage capacitor.

Compared with the prior art, the embodiments of the present disclosure provide the pixel driving circuit, the driving method thereof, and the display panel. The pixel driving circuit includes a light-emitting device, a driving transistor, a compensation module, and a data writing module, wherein the driving transistor is configured to provide a driving current to the light-emitting device, and the compensation module at least includes: a storage capacitor configured to maintain a gate voltage of the driving transistor; a first transistor, wherein one of a source or a drain of the first transistor is connected to a gate of the driving transistor, and the first transistor is configured to transmit a first reset signal to the gate of the driving transistor; a second transistor configured to transmit a second reset signal to one of a source or a drain of the driving transistor; and a compensation transistor, wherein the storage capacitor is connected in series between one of a source or a drain of the compensation transistor and the gate of the driving transistor, another one of the source or the drain of the compensation transistor is connected to one of the source or the drain of the driving transistor, and the compensation transistor accompanying with the second transistor and the storage capacitor is configured to compensate a threshold voltage of the driving transistor; wherein the data writing module at least includes a data writing transistor, one of a source or a drain of the data writing transistor is connected to an upper plate of the storage capacitor, and the data writing transistor is configured to write a data signal into the storage capacitor and to transmit the data signal to the gate of the driving transistor, to realize compensating the threshold voltage of the driving transistor, and thereby improving the display effect.

DETAILED DESCRIPTION OF PREFERRED EMBODIMENTS

Figure 1A:
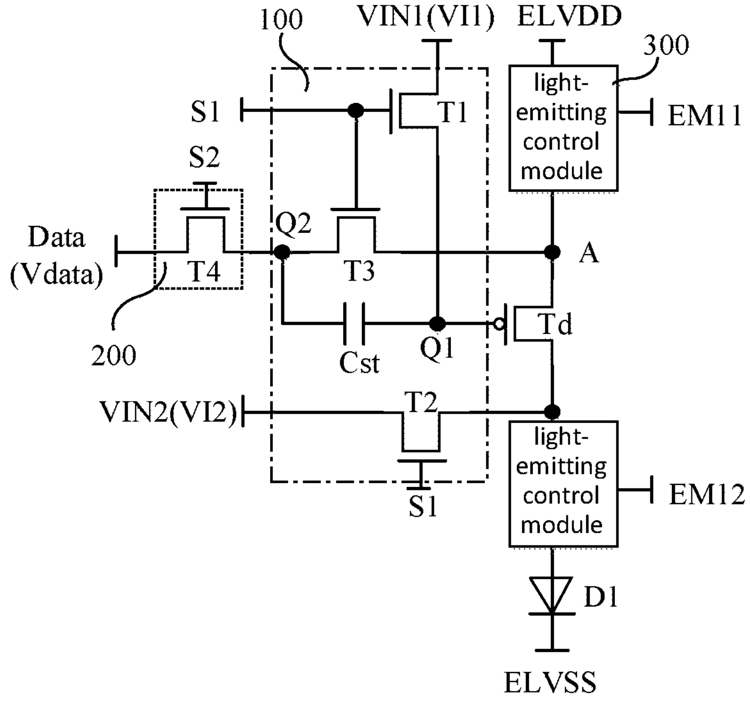
FIG. 1A to FIG. 1D are schematic diagrams of a pixel driving circuit provided by embodiments of the present disclosure.
Figure 1B:
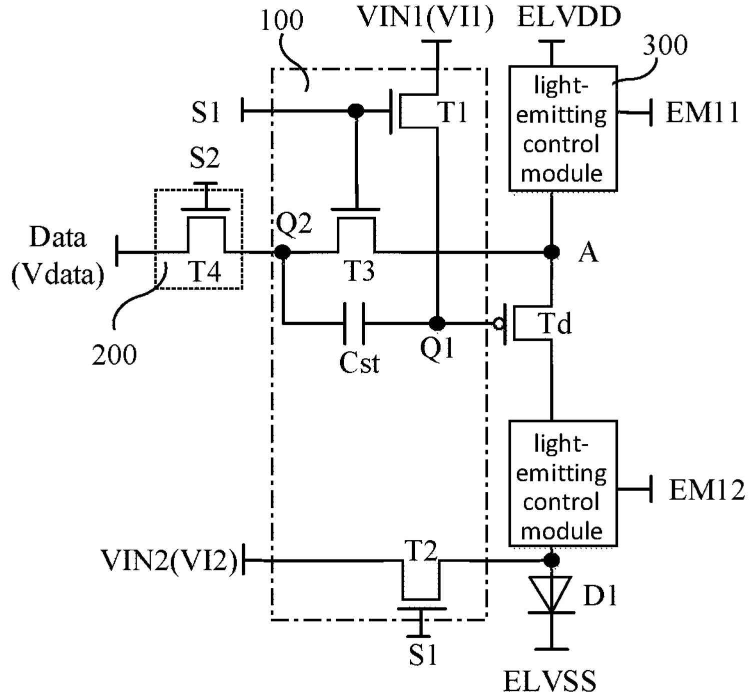
Figure 1C:
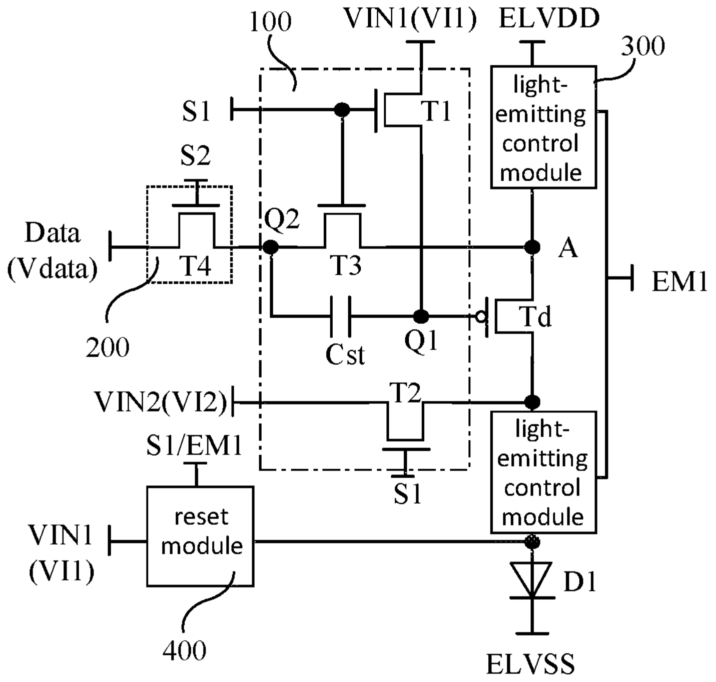
Figure 1D:
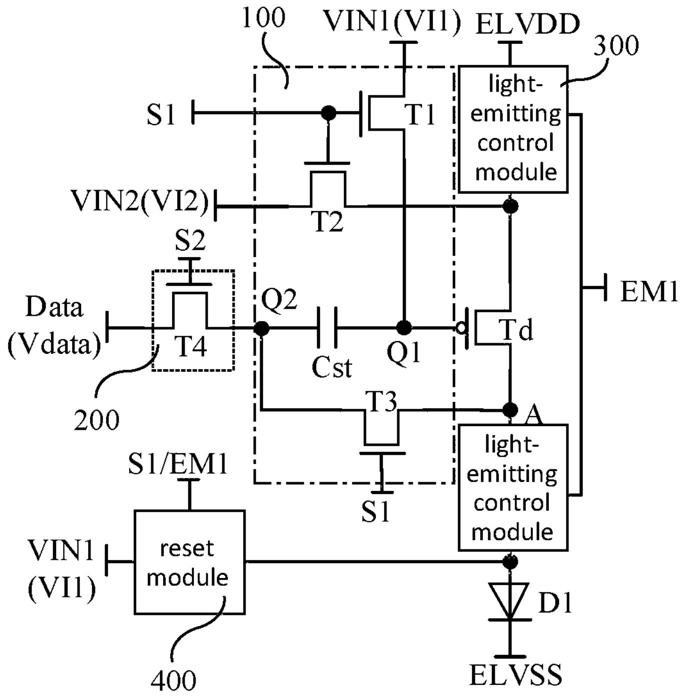

In order to make the purpose, technical solutions and effects of the present disclosure clearer, the following further describes the present disclosure in detail with reference to the figures and embodiments. It should be understood that the specific embodiments described here are only used to explain the present disclosure, and not used to limit the present disclosure.

Specifically, please refer to FIGS. 1A to 1D, which are schematic diagrams of a pixel driving circuit provided by embodiments of the present disclosure; FIGS. 2A to 2F, which are schematic structural diagrams of the pixel driving circuit provided by embodiments of the present disclosure; and FIGS. 3A to 3C, which are operating timing diagrams of the pixel driving circuit provided by embodiments of the present disclosure.

The present disclosure provides a pixel driving circuit, including: a light-emitting device D1, a driving transistor Td, a compensation module 100, and a data writing module 200, wherein the driving transistor Td is configured to provide a driving current to the light-emitting device D1, and the compensation module 100 at least includes:

- a storage capacitor Cst configured to maintain a gate voltage of the driving transistor Td;
- a first transistor T1, wherein one of a source or a drain of the first transistor T1 is connected to a gate of the driving transistor Td, and the first transistor T1 is configured to transmit a first reset signal VI1 to the gate of the driving transistor Td;
- a second transistor T2 configured to transmit a second reset signal VI2 to one of a source or a drain of the driving transistor Td; and
- a compensation transistor T3, wherein the storage capacitor Cst is connected in series between one of a source or a drain of the compensation transistor T3 and the gate of the driving transistor Td, another one of the source or the drain of the compensation transistor T3 is connected to one of the source or the drain of the driving transistor Td, and the compensation transistor T3 accompanying with the second transistor T2 and the storage capacitor Cst is configured to compensate a threshold voltage Vth of the driving transistor Td;
- wherein the data writing module 200 at least comprises a data writing transistor T4, one of a source or a drain of the data writing transistor T4 is connected to an upper plate of the storage capacitor Cst, and the data writing transistor T4 is configured to write a data signal Vdata into the storage capacitor Cst and to transmit the data signal Vdata to the gate of the driving transistor Td.

The pixel driving circuit resets the gate voltage of the driving transistor Td by the first transistor T1 in the compensation module 100, and realizes sampling and compensating the threshold voltage Vth of the driving transistor Td by the second transistor T2 in the compensation module 100, the compensation transistor T3, and the storage capacitor Cst, so as to improve the display effect and reduce the power consumption.

Please continue to refer to FIGS. 2A to 2F, a type of the driving transistor Td is different from a type of the first transistor T1, the second transistor T2, the compensation transistor T3, and the data writing transistor T4.

Specifically, the driving transistor Td is a silicon transistor, and the first transistor T1, the second transistor T2, the compensation transistor T3, and the data writing transistor T4 are oxide transistors, so as to use the technical feature that the leakage current of oxide transistors is less than that of silicon transistors, which reduces the influence of one of the source or drain (point A) of the driving transistor Td on the voltage of the gate (point Q1) of the driving transistor Td, thereby ensuring all the gate voltages of the driving transistors Td are stable.

The silicon transistors include single crystal silicon transistors, polycrystalline silicon transistors, microcrystalline silicon transistors, and transistors containing amorphous silicon or other silicon, and the oxide transistors containing metal such as zinc, indium, gallium, tin, or titanium, etc. Further, the polycrystalline silicon transistors include low-temperature polysilicon transistors, and the oxide transistors containing zinc oxide, zinc tin oxide, zinc indium oxide, indium oxide, titanium oxide, indium gallium zinc oxide, or indium zinc tin oxide, etc.

The driving transistors Td may be P-type transistors or N-type transistors, and the first transistor T1, the second transistor T2, the compensation transistor T3, and the data writing transistor T4 may be P-type transistors or N-type transistors. Further, the driving transistor Td is a P-type transistor, and the first transistor T1, the second transistor T2, the compensation transistor T3, and the data writing transistor T4 are N-type transistors.

Please continue to refer to FIGS. 1A to 1D and FIGS. 2A to 2F, the pixel driving circuit further includes a light-emitting control module 300 for controlling the light-emitting device D1 to emit light, wherein the light-emitting control module 300 at least includes:

- a first switching transistor T5, wherein one of a source or a drain of the first switching transistor T5 is connected to a second voltage terminal ELVDD, and another one of the source or the drain of the first switching transistor is connected to one of the source or the drain of the driving transistor Td; and
- a second switching transistor T6, wherein one of a source or a drain of the second switching transistor T6 is connected to one of the source or the drain of the driving transistor Td, and another one of the source or the drain of the second switching transistor is connected to an anode of the light-emitting device D1.

Further, a type of the first switching transistor T5 and the second switching transistor T6 is the same as the driving transistor Td, specifically, the first switching transistor T5 and the second switching transistor T6 are silicon transistors, wherein the first switching transistor T5 and the second switching transistor T6 may be P-type transistors or N-type transistors, which will not be repeated here.

Please continue to refer to FIGS. 1A to 1B, 2A to 2B, and 3A, the gate of the first switching transistor T5 is connected to a first light-emitting control signal line EM11, and the gate of the second switching transistor T6 is connected to a second light emitting control signal line EM12, and one of the source or the drain of the second transistor T2 is connected to one of the source or the drain of the second switching transistor T6, wherein the second transistor T2 is configured to transmit the second reset signal VI2 to an anode of the light-emitting device D1 to initialize the anode voltage of the light-emitting device D1.

Further, a second light-emitting control signal EM(n+1) loaded by the second light-emitting control signal line EM12 is lagged behind a first light-emitting control signal EM(n) loaded by the first light-emitting control signal line EM11, and voltage values of the first reset signal VI1 and the second reset signal VI2 are equal, so that when the second transistor T2 and the second switching transistor T6 are turned on simultaneously, compensation of the threshold voltage Vth of the driving transistor Td is achieved, and the anode of the light-emitting device D1 is reset.

Please continue to refer to FIGS. 1C to 1D, 2C to 2F, and 3B, wherein one of the source or the drain of the second transistor T2 is connected to one of the source or the drain of the driving transistor Td.

Further, the pixel driving circuit includes a reset module 400, wherein the reset module 400 at least includes a reset transistor T7, one of a source or a drain of the reset transistor T7 is connected to the anode of the light-emitting device D1, and the reset transistor T7 is configured to transmit the first reset signal VI1 to the anode of the light-emitting device D1, so as to achieve reset the anode voltage of the light-emitting device D1. Further, a type of the reset transistor T7 is different from a type of the first switching transistor T5, the second switching transistor T6, and the driving transistor Td, and further, the reset transistor T7 can be an oxide transistor.

Further, a type of carrier in the semiconductor layers of the reset transistor T7 is different from a type of carrier in the semiconductor layers of the first switching transistor T5 and the second switching transistor T6. Specifically, a type of the reset transistor T7 is one of the N-type transistor or the P-type transistor, and types of the first switching transistor T5, the second switching transistor T6 are another one of the N-type transistor or the P-type transistor. Furthermore, the reset transistor T7 is the N-type transistor, and the first switching transistor T5 and the second switching transistor T6 are P-type transistors.

Gates of the first transistor T1, the second transistor T2, the compensation transistor T3, and the reset transistor T7 can connect to a first scan signal line S1, and by using the first scan signal Nscan(n−1) loaded in the first scan signal line S1, the control of the first transistor T1, the second transistor T2, the compensation transistor T3, and the reset transistor T7 is realized, which can reduce a number of control signal lines.

In addition, the reset transistor T7 may also share the same control signal line with the first switching transistor T5 and the second switching transistor T6. Specifically, gates of the reset transistor T7, the first switching transistor T5, and the second switching transistor T6 are connected to the light-emitting control signal line EM1, and by using the light-emitting control signal EM loaded in the light-emitting control signal line EM1, the control of the first switching transistor T5, the second switching transistor T6, and the reset transistor T7 is realized to reduce the number of control signal lines.

Since the type of the reset transistor T7 is one of the N-type transistor or the P-type transistor, and the type of the first switching transistor T5, the second switching transistor T6 is another one of the N-type transistor or the P-type transistor, therefore, when resetting the anode of the light-emitting device D1 by the light-emitting control signal EM, the first switching transistor T5 and the second switching transistor T6 are both in an off state, which can increase a resetting duration of the anode of the light-emitting device D1 and will not affect the normal display of the light-emitting device D1. In addition, a control signal can be separately set to control the reset transistor T7 to reset the anode of the light-emitting device D1, which will not be repeated here.

Please continue to refer to FIGS. 1C to 1D, 2C to 2F, and 3B. The first reset signal VI1 and the second reset signal VI2 are DC low-level signals, and a voltage value of the first reset signal VI1 is different from a voltage value of the second reset signal VI2. Further, the voltage value of the first reset signal VI1 is less than the voltage value of the second reset signal VI2, so that the storage capacitor Cst can be discharged to the second reset signal line VIN2 loaded with the second reset signal VI2 by the compensation transistor T3 and the second transistor T2, therefore the storage capacitor Cst can sample the threshold voltage Vth of the driving transistor Td to realize the compensation of the threshold voltage Vth of the driving transistor Td.

It can be understood that since the first reset signal VI1 and the second reset signal VI2 are DC low-level signals, the voltage value of the first reset signal VI1 is less than the voltage value of the second reset signal VI2, it means that when the voltage value of the first reset signal VI1 is a negative value, the voltage value of the second reset signal VI2 is a value more negative than the voltage value of the first reset signal VD.

Similarly, the first reset signal VI1 and the second reset signal VI2 may also be DC high-level signals; further, the voltage value of the first reset signal VI1 is greater than the voltage value of the second reset signal VI2, that is, if the voltage value of the first reset signal VI1 is a positive value, the voltage value of the second reset signal VI2 is a positive value less than the voltage value of the first reset signal VI1.

Please continue to refer to FIGS. 1A to 1D and 2A to 2F, the gate of the data writing transistor T4 is connected to the second scan signal line S2 to respond the second scan signal Nscan(n) loaded by the second scan signal line S2, to write the data signal Vdata into the storage capacitor Cst and transmit it to the gate of the driving transistor Td.

A cathode of the light-emitting device D1 is connected to a first voltage terminal ELVSS, the light-emitting device D1 includes one of an organic light-emitting diode, a sub-millimeter light-emitting diode, or a micro light-emitting diode.

The gate of the driving transistor Td can be used in common as a bottom plate of the storage capacitor Cst to achieve optimal space allocation and save process steps. In addition, the bottom plate of the storage capacitor Cst can also be formed separately, which will not be repeated here.

In the pixel driving circuits shown in FIGS. 1A to 1D and FIGS. 2A to 2F, the cathode of the light-emitting device D1 is connected to the first voltage terminal ELVSS as an example; in addition, the light-emitting device D1 can also be arranged in the pixel driving circuit by a form of connected to the anode the second voltage terminal ELVDD, which will not be repeated here.

The present disclosure also provides a driving method for driving the pixel driving circuit, in an Nth frame period, the driving method includes:

in an initialization phase t1, transmitting the first reset signal VI1 to the gate of the driving transistor Td by the first transistor T1 of the compensation module 100 to initialize the gate voltage of the driving transistor Td, and compensating the threshold voltage Vth of the driving transistor Td by the second transistor T2, the compensation transistor T3, and the storage capacitor Cst;

in a data writing phase t2, writing the data signal Vdata to the storage capacitor Cst and transmitting the data signal Vdata to the gate of the driving transistor by the storage capacitor;

in a light-emitting phase t3, driving the light-emitting device D1 to emit light by the driving transistor Td, and compensating the threshold voltage Vth of the driving transistor Td by the compensation module 100.

The operating principle of driving the pixel driving circuit by the driving method will be described in detail below with reference to FIGS. 2A to 2F and FIGS. 3A to 3C. In the pixel driving circuits shown in FIGS. 2A to 2F, the driving transistor Td, the first switching transistor T5, and the second switching transistor T6 are all P-type silicon transistors, and the first transistor T1, the second transistor T2, the compensation transistor T3, and the data writing transistor T4 are N-type oxide transistors as an example. The reset transistor T7 will be described as N-type oxide transistor in the pixel driving circuit as shown in FIGS. 2C to 2F.

Figure 2A:
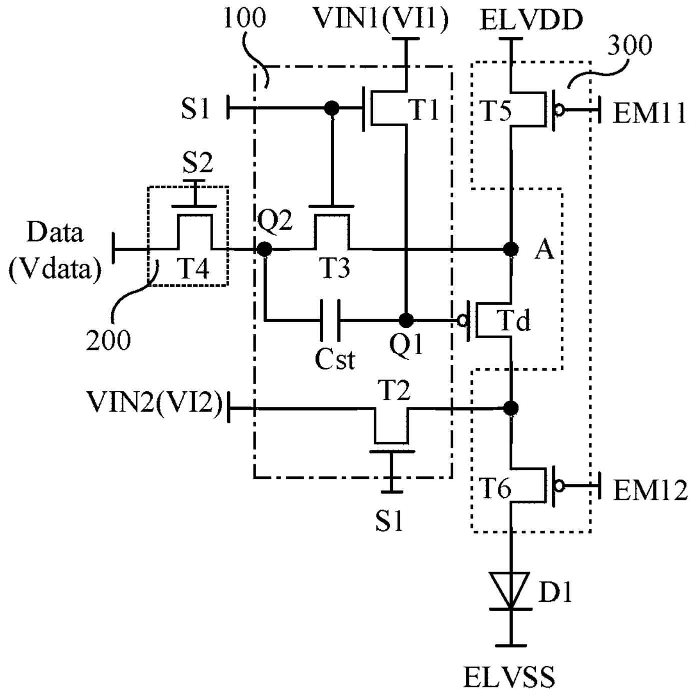
FIG. 2A to FIG. 2F are schematic structural diagrams of the pixel driving circuit provided by embodiments of the present disclosure.
Figure 2B:
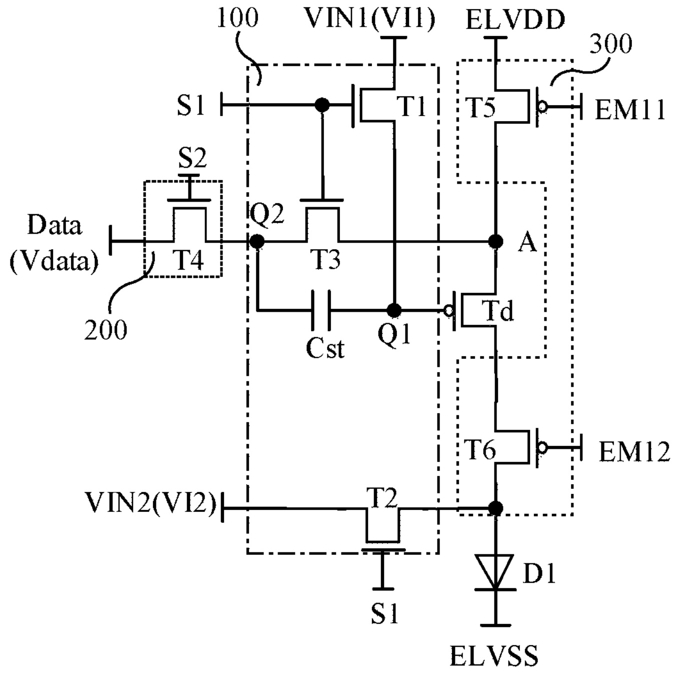
Figure 3A:
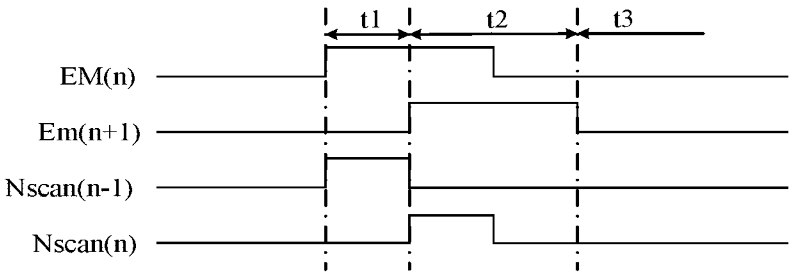
FIG. 3A to FIG. 3C are operating timing diagrams of the pixel driving circuit provided by embodiments of the present disclosure.
Figure 3B:
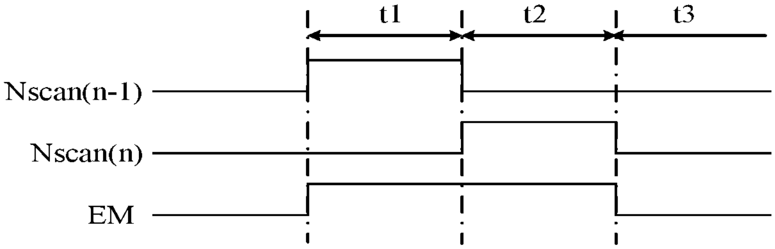
Figure 3C:
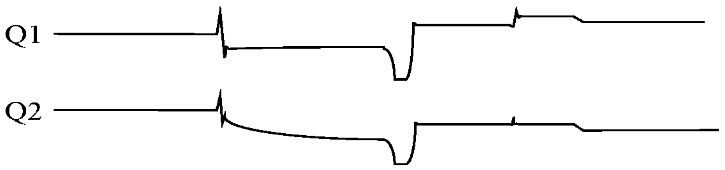
Figure 4A:
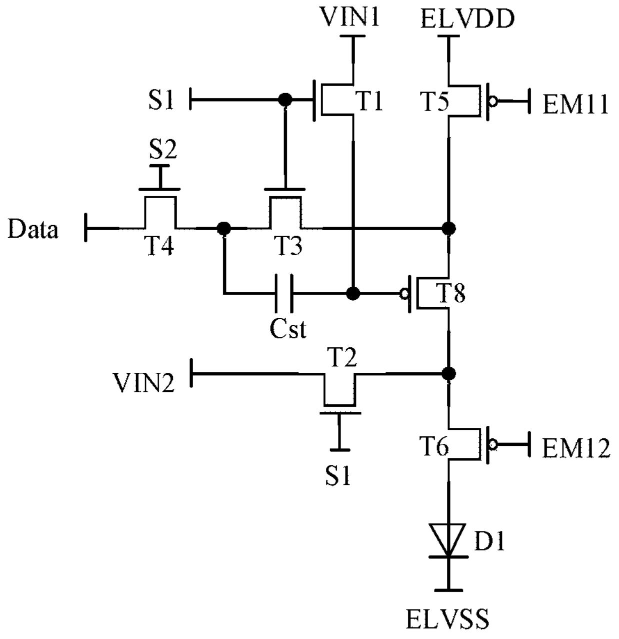
FIG. 4A to FIG. 4F are schematic structural diagrams of the pixel driving circuit provided by embodiments of the present disclosure.
Figure 4B:
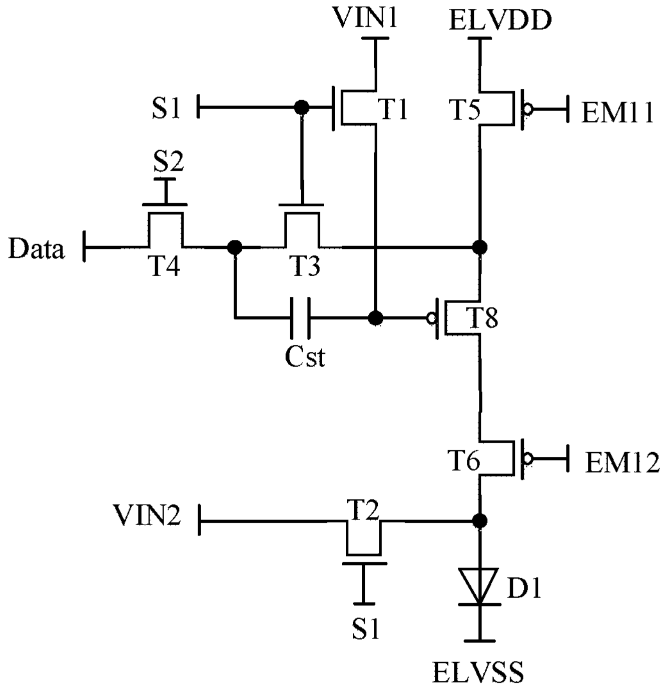
Figure 4C:
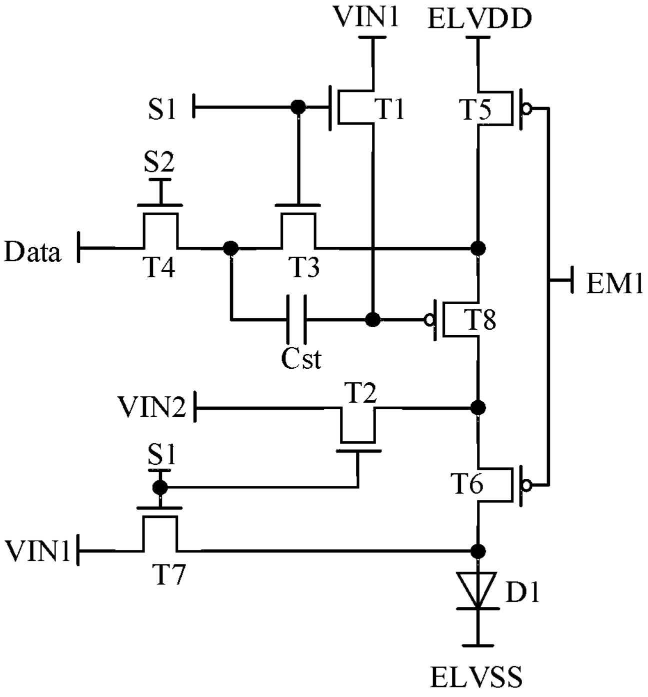
Figure 4D:
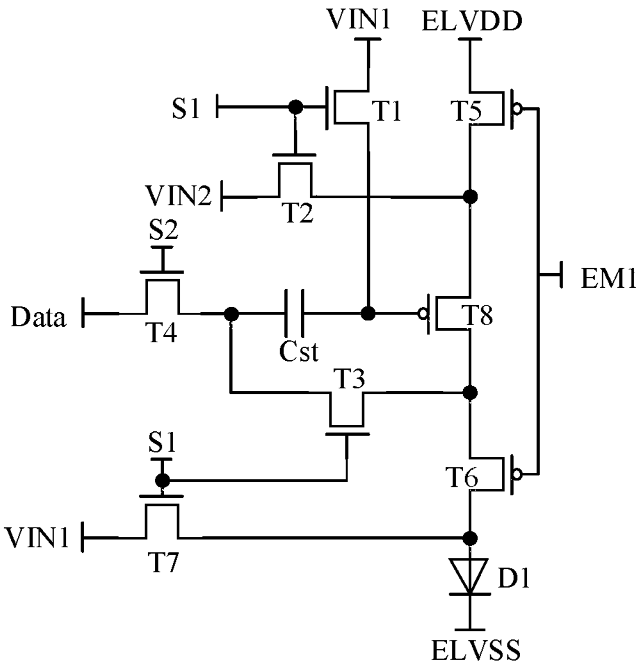
Figure 4E:
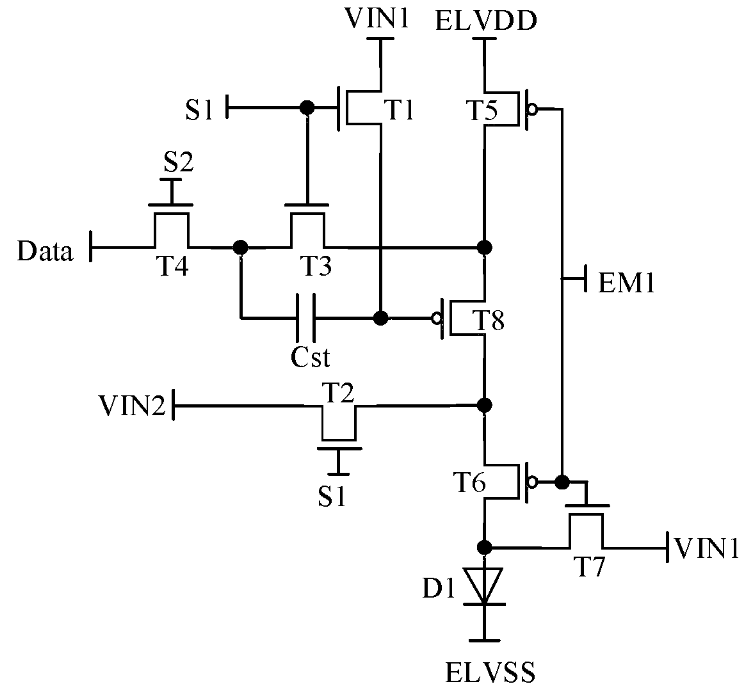
Figure 4F:
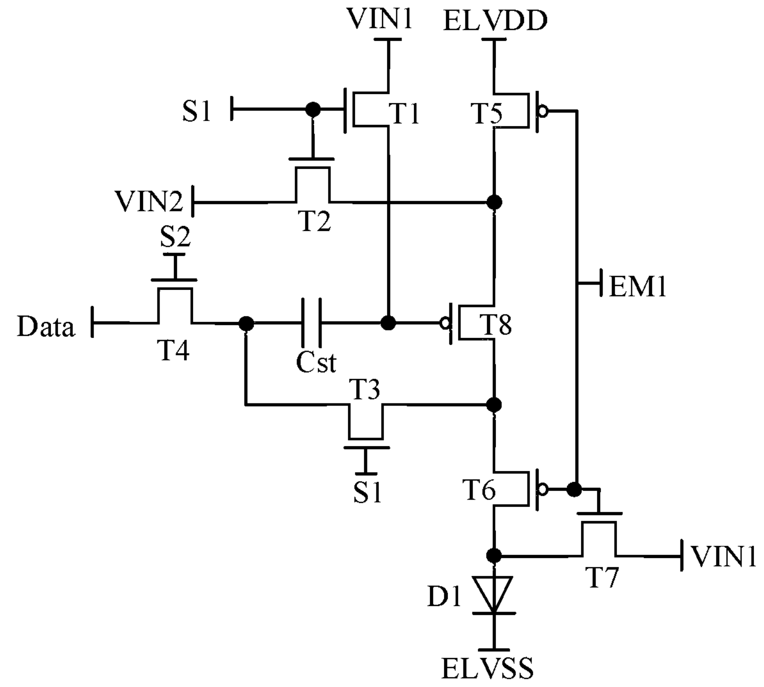

Specifically, please continue to refer to FIG. 2A to FIG. 2B and FIG. 3A, taking the voltage values of the first reset signal VI1 and the second reset signal VI2 being the same as an example, the Nth frame period includes:

In the initialization phase t1: turning on the first transistor T1, the second transistor T2, and the compensation transistor T3 in response to the first scan signal Nscan(n−1) loaded by the first scan signal line S1, turning on the second switching transistor T6 in response to the second light-emitting control signal EM(n+1) loaded by the second light-emitting control signal line EM12, transmitting the first reset signal VI loaded by the first reset signal line VIN1 to the gate of the driving transistor Td, transmitting the second reset signal VI2 loaded by the second reset signal line VIN2 to the anode of the light-emitting device D1, and initializing the gate voltage of the driving transistor Td (that is, transmitting the first reset signal VI1 to point Q1) and the anode voltage of the light-emitting device D1; at the same time, since the second transistor T2 and the compensation transistor T3 are turned on, the storage capacitor Cst is discharged (that is, in FIG. 2A, discharging from point Q2 through the compensation transistor T3, the driving transistor Td, and the second transistor T2 to the second reset signal line VIN2; in FIG. 2B, discharging from the point Q2 through the compensation transistor T3, the driving transistor Td, the second switching transistor T6, and the second transistor T2 to the second reset signal line VIN2) until the voltage of point A is equal to the sum of the gate voltage of the driving transistor Td (i.e. the voltage at point Q1) and the threshold voltage Vth of the driving transistor Td, turning off the driving transistor Td, and turning on the compensation transistor T3 so that the voltage at point A is equal to the voltage at point Q2, that is, the voltage difference between the upper plate and the lower plate of the storage capacitor Cst is equal to the threshold voltage Vth of the driving transistor Td, so as to realize the sampling and the compensation of the threshold voltage Vth of the driving transistor Td.

In the data writing phase t2: turning on the data writing transistor T4 in response to the second scan signal Nscan(n) loaded by the second scan signal line S2, and writing the data signal Vdata to an upper plate of the storage capacitor Cst (i.e. point Q2), and transmitting the data signal Vdata to the gate of the driving transistor Td (i.e. point Q1) to complete the writing of the data signal Vdata.

In the light-emitting phase t3: turning on the first switching transistor T5 in response to the first light-emitting control signal EM(n) loaded by the first light-emitting control signal line EM11, turning on the second switching transistor T6 in response to the second light-emitting control signal EM(n+1) loaded by the second light-emitting control signal line EM12; if the data signal Vdata transmitted to the gate of the driving transistor Td in the data writing phase t2 can turn on the driving transistor Td, then the driving transistor Td generates the driving current due to the conduction of the first switching transistor T5 and the second switching transistor T6 to drive the light-emitting device D1 to emit light; if the data signal Vdata transmitted to the gate of the driving transistor Td in the data writing phase t2 cannot turn on the driving transistor Td, then the driving transistor Td remaining in the off state, even if turning on the first switching transistor T5 and the second switching transistor T6, the light-emitting device D1 still does not emit light.

Since in the initialization phase t1, the second transistor T2 and the second switching transistor T6 turn on at the same time, therefore, the second transistor T2 and the second switching transistor T6 can be used as shown in FIG. 2A for resetting the anode of the light-emitting device D1, compensating the threshold voltage Vth of the driving transistor Td by the second transistor T2, the compensation transistor T3, and the storage capacitor Cst, as shown in FIG. 2B, resetting the anode of the light-emitting device D1 can be achieved by using the second transistor T2, and the second transistor T2 can realize compensation of the threshold voltage of driving transistor Td indirectly by the second switching transistor T6, the compensation transistor T3, and the storage capacitor Cst, thus, it is possible to omit the provision of a transistor for resetting the anode of the light-emitting device D1.

In addition, a transistor configured to reset the anode of the light-emitting device D1 may also be separately provided. Specifically, please continue to refer to FIGS. 2C to 2F and FIGS. 3B to 3C, which provide explanation with the first reset signal VI1 and the second reset signal VI2 being a low electrical potential signal, and a voltage value of the first reset signal VI1 being less than a voltage value of the second reset signal VI2.

Please continue to refer to FIGS. 2C to 2D and FIGS. 3B to 3C, with sharing the first scan signal Nscan(n−1) by the reset transistor T7, the first transistor T1, the second transistor T2, and the compensation transistor T3 as an example, wherein the Nth frame period includes:

In the initialization phase t1, turning on the first transistor T1, the second transistor T2, the compensation transistor T3, and the reset transistor T7 in response to the first scan signal Nscan(n−1) loaded by the first scan signal line S1, the first reset signal VI1 loaded by the first reset signal line VIN1 is transmitted to the gate of the driving transistor Td and the anode of the light-emitting device D1, and the gate voltage of the driving transistor Td and the anode voltage of the light-emitting device D1, at the same time, since the second transistor T2 and the compensation transistor T3 are turned on, the voltage value of the second reset signal VI2 is more negative than the voltage value of the first reset signal VI1, so the storage capacitor Cst is discharged from point Q2 to the second reset signal line VIN2 through the compensation transistor T3, the driving transistor Td, and the second transistor T2, until the voltage value at point A is equal to the sum of the gate voltage of the driving transistor Td (i.e. the voltage value at point Q1) and the threshold voltage Vth of the driving transistor Td, the driving transistor Td is turned off and the compensation transistor T3 is turned on so that the voltage value at point A is equal to the voltage value at point Q2, that is, the voltage difference between the upper plate and the lower plate of the storage capacitor Cst is equal to the threshold voltage Vth of the driving transistor Td, thereby realizing sampling and compensation of the threshold voltage Vth of the driving transistor Td.

In the data writing phase t2: turning on the data writing transistor T4 in response to the second scanning signal Nscan(n) loaded by the second scanning signal line S2, and writing the data signal Vdata loaded by the data signal line Data to the upper plate of the storage capacitor Cst (i.e. point Q2), and transmitting the data signal Vdata to the gate of the driving transistor Td (i.e. point Q1) to complete the writing of the data signal Vdata.

In the light-emitting phase t3: the first switching transistor T5 and the second switching transistor T6 respond to the light-emitting control signal EM loaded by the light-emitting control signal line EM1; if the data signal Vdata transmitted to the gate of the driving transistor Td during the data writing phase t2 can turn on the driving transistor Td, then the driving transistor Td generating a driving current to drive the light-emitting device D1 to emit light due to the conduction of the first switching transistor T5 and the second switching transistor T6; if the data signal Vdata transmitted to the gate of the driving transistor Td during the data writing phase t2 cannot turn on the driving transistor Td, then the driving transistor Td still maintaining at an off state, and even if turning on the first switching transistor T5 and the second switching transistor T6, the light-emitting device D1 does not emit light.

Similarly, please continue to refer to FIGS. 2E to 2F and FIGS. 3B to 3C, taking the reset transistor T7, the first switching transistor T5, and the second switching transistor T6 sharing the light-emitting control signal EM as an example, in the Nth frame period including:

In the initialization phase t1: turning on the first transistor T1, the second transistor T2, and the compensation transistor T3 in response to the first scan signal Nscan(n−1); turning on the reset transistor T7 in response to the light-emitting control signal EM, the first reset signal VI1 is transmitted to the gate of the driving transistor Td and the anode of the light-emitting device D1, and initializing the gate voltage of the driving transistor Td and the light-emitting device D1; at the same time, discharging the storage capacitor Cst from the point Q2 through the compensation transistor T3, the driving transistor Td and the second transistor T2 to the second reset signal line VIN2 until the voltage at point A equal to the sum of the gate voltage of the driving transistor Td (i.e. the voltage at point Q1) and the threshold voltage Vth of the driving transistor Td, turning off the driving transistor Td, and a voltage difference between the upper plate and the lower plate of the storage capacitor Cst is equal to the threshold voltage Vth of the driving transistor Td, thereby realizing sampling and compensation of the threshold voltage Vth of the driving transistor Td.

In the data writing phase t2: continue turning on the reset transistor T7 in response to the light-emitting control signal EM loaded by the light-emitting control signal line EM1, and turning on the data writing transistor T4 in response to the second scan signal Nscan(n) loaded by the second scan signal line S2, transmitting the first reset signal VD to the anode of the light-emitting device D1 to initialize the anode voltage of the light-emitting device D1, writing the data signal Vdata loaded by the data signal line Data to the upper plate of the storage capacitor Cst (i.e. point Q2), and transmitting the data signal Vdata to the gate of the driving transistor Td (i.e. point Q1) to complete the writing of the data signal Vdata.

In the light-emitting phase t3: turning on the first switching transistor T5 and the second switching transistor T6 in response to the light-emitting control signal EM loaded by the light-emitting control signal line EM1, turning off the reset transistor T7 in response to the light-emitting control signal EM loaded by the light-emitting control signal line EM1. If the data signal Vdata transmitted to the gate of the driving transistor Td during the data writing phase t2 can turn on the driving transistor Td, the driving transistor Td generates a driving current due to the conduction of the first switching transistor T5 and the second switching transistor T6 to drive the light-emitting device D1 to emit light; if the data signal Vdata transmitted to the gate of the driving transistor Td during the data writing phase t2 cannot turn on the driving transistor Td, then the driving transistor Td remaining in the off state, even if turning on the first switching transistor T5 and the second switching transistor T6, the light-emitting device D1 still does not emit light.

In FIGS. 2A to 2F, since in the initialization phase t1, the compensation module 100 carried out sampling and compensation on the threshold voltage Vth of the driving transistor Td, in the data writing phase t2, still storing the threshold voltage Vth of the driving transistor Td in the storage capacitor Cst, so in the light-emitting phase t3, the compensation module 100 can compensate the threshold voltage Vth of the driving transistor Td, thereby eliminating the influence of the threshold voltage Vth, maintaining the stability of the light-emitting device D1.

In addition, since the first transistor T1, the second transistor T2, and the compensation transistor T3 are oxide transistors with a small leakage current, therefore an influence of one of the source or drain (point A) of the driving transistor Td can be reduced on the voltage of the gate of the driving transistor Td (point Q1), thereby ensuring that the gate voltage of the driving transistor Td is stable.

It can be seen from FIGS. 2C to 2F that the reset transistor T7, the first switching transistor T5, the second switching transistor T6 sharing the light-emitting control signal EM, can not only reduce the number of control signal lines, but also can increase the time for resetting the anode of the light-emitting device D1 to ensure the light-emitting effect of the light-emitting device D1.

The present disclosure also provides a display panel including a pixel driving circuit, as shown in FIGS. 4A to 4F, which are schematic structural diagrams of the pixel driving circuit provided by the embodiment of the present disclosure, and the pixel driving circuit includes:

a storage capacitor Cst;

a light-emitting device D1, wherein a cathode of the light-emitting device D1 is connected to a first voltage terminal ELVSS;

a first transistor T1, wherein a gate of the first transistor T1 is connected to a first scan signal line S1, one of a source or a drain of the first transistor T1 is connected to a first reset signal line VIN1, and another one of the source or the drain of the first transistor is connected to a gate of an eighth transistor T8;

a second transistor T2, wherein a gate of the second transistor T2 is connected to the first scan signal line S1, and one of a source or a drain of the second transistor T2 is connected to a second reset signal line VIN2;

a third transistor T3, wherein a gate of the third transistor T3 is connected to the first scan signal line S1, the storage capacitor Cst is connected in series between one of a source or a drain of the third transistor T3 and the gate of the eighth transistor T8, and another one of the source or the drain of the third transistor T3 is connected to one of a source or a drain of the eighth transistor T8; and a fourth transistor T4, wherein a gate of the fourth transistor T4 is connected to a second scan signal line S2, one of a source or a drain of the fourth transistor T4 is connected to a data signal line Data, and another one of the source or the drain of the fourth transistor is connected to an upper plate of the storage capacitor Cst.

According to the above, the resetting of the gate voltage of the eighth transistor T8 realized by the first transistor T1, the sampling and the compensation of threshold voltage Vth to the eighth transistor T8 realized by the second transistor T2, the third transistor T3, and the storage capacitor Cst, thereby improving the display effect of the display panel, reducing the power consumption of the display panel, and facilitating the ultra-low power consumption display of the display panel.

In the display panel, in order to optimize space allocation and save manufacturing process, the gate of the eighth transistor T8 can be used as a bottom plate of the storage capacitor Cst. In addition, the bottom plate of the storage capacitor Cst can also be manufactured separately, which will not be repeated here.

Further, material of semiconductor layer of the eighth transistor T8 is different from material of semiconductor layers of the first transistor T1, the second transistor T2, the third transistor T3, and the fourth transistor T4.

Specifically, the eighth transistor T8 includes one of a silicon semiconductor layer or an oxide semiconductor layer, and the first transistor T1, the second transistor T2, the third transistor T3, and the fourth transistor T4 include another one of the silicon semiconductor layer or the oxide semiconductor layer. Further, the eighth transistor T8 includes the silicon semiconductor layer, and the first transistor T1, the second transistor T2, the third transistor T3, and the fourth transistor T4 include the oxide semiconductor layer.

The silicon semiconductor layer includes an N-type or a P-type silicon semiconductor, and the oxide semiconductor layer may include at least one of zinc oxide, zinc tin oxide, zinc indium oxide, indium oxide, titanium oxide, indium gallium zinc oxide, or indium zinc tin oxide.

Please continue to refer to FIGS. 4A to 4F. The pixel driving circuit further includes:

a fifth transistor T5, wherein a gate of the fifth transistor T5 is connected to a light-emitting control signal line EM1, one of a source or a drain of the fifth transistor T5 is connected to a second voltage terminal ELVDD, and another one of the source or the drain is connected to one of the source or the drain of the eighth transistor T8; and a sixth transistor T6, wherein a gate of the sixth transistor T6 is connected to the light-emitting control signal line EM1, one of a source or a drain of the sixth transistor T6 is connected to one of the source or the drain of the eighth transistor T8, and another one of the source or the drain of the connected to an anode of the light-emitting device D1.

Further, the light-emitting control signal line EM1 includes a first light-emitting control signal line EM11 connected to the gate of the fifth transistor T5, and a second light-emitting control signal line EM12 connected to the gate of the sixth transistor T6, and one of the source or the drain of the second transistor T2 is connected to one of the source or the drain of the sixth transistor T6.

Please continue to refer to FIGS. 4C to 4F, one of the source or the drain of the second transistor T2 is connected to one of a source or a drain of a driving transistor Td.

Further, the pixel driving circuit further includes a seventh transistor T7, a gate of the seventh transistor T7 is connected to the first scan signal line S1 or the light-emitting control signal line EM1, one of a source or a drain of the seventh transistor T7 is connected to the first reset signal line VIN1, and another one of the source or the drain of the seventh transistor T7 is connected to the anode of the light-emitting device D1.

Gates of the seventh transistor T7, the first transistor T1, the second transistor T2, and the third transistor T3 are connected to the first scan signal line S1, which can reduce a number of control signal lines and facilitate the narrow frame design of the display panel.

Further, a type of carrier in the seventh transistor T7 is different from a type of carrier in the fifth transistor T5 and the sixth transistor T6, so that the gate of the seventh transistor T7 can be connected to the light-emitting control signal line EM1, while reducing the number of control signal lines, which can increase the reset time of the anode of the light-emitting device D1 to ensure the display effect of the display panel.

Specifically, the seventh transistor T7 is one of an N-type transistor or a P-type transistor, and the fifth transistor T5 and the sixth transistor T6 are another one of the N-type transistor or the P-type transistor. Furthermore, the seventh transistor T7 is the N-type transistor, and the fifth transistor T5 and the sixth transistor T6 are P-type transistors. Further, a type of the eighth transistor T8 is different from a type of the seventh transistor T7; further, the seventh transistor T7 is the oxide transistor.

In addition, at the moment of shutdown, the display screen can be scanned black by the light-emitting control signal loaded in the light-emitting control signal line EM1, so that the anode of the light-emitting device D1 is reset again, and further increasing the reset time of the anode of the light-emitting device D1 to improve the dark state/low grayscale display effect.

In the pixel driving circuits shown in FIGS. 4A to 4F, wherein the first transistor T1, the second transistor T2, the third transistor T3, the fourth transistor T4, and the seventh transistor T7 are N-type transistors, the fifth transistor T5, the sixth transistor T6, and the eighth transistor T8 are P-type transistors as one embodiment. Those skilled in the art can also replace P-type transistors with N-type transistors, and replace N-type transistors with P-type transistors, and the corresponding control signals are inverted to achieve the above functions, which will not be repeated here.

The light-emitting device D1 includes one of an organic light-emitting diode, a sub-millimeter light-emitting diode, or a micro light-emitting diode. Further, the light-emitting device D1 includes an anode, a cathode, and a light-emitting layer located between the anode and the cathode. Furthermore, the light-emitting layer also includes quantum dot materials, perovskite materials, and the like.

In other different embodiment, the present disclosure further provides a display panel, including a pixel driving circuit, wherein the pixel driving circuit includes:

a first power supply ELVDD, a second power supply ELVSS, a first transistor Td, a second first transistor T6, a storage capacitor Cst, and a light-emitting device D1, wherein the first transistor Td, the second transistor T6, and the light-emitting device D1 are connected in series between the first power supply ELVDD and the second power supply ELVSS;

a third transistor T4, wherein one of a source or a drain of the third transistor T4 is electrically connected to a data signal line Data, the other one of the source or the drain of the third transistor T4 is electrically connected to an electrode plate (the upper plate) of the storage capacitor Cst, and the other electrode plate (the lower plate) of the storage capacitor Cst is electrically connected to a gate of the first transistor Td; and a fourth transistor T1, wherein one of a source or a drain of the fourth transistor T1 is electrically connected to a first reset signal line VIN1, the other of the source or the drain of the fourth transistor T1 is electrically connected to the other electrode plate (the lower plate) of the storage capacitor Cst.

In some embodiment, the display panel further includes a fifth transistor T3 electrically connected between the data signal line Data and one of a source or a drain of the first transistor Td. A type of the first transistor Td is different from a type of the second transistor T6, the third transistor T4, the fourth transistor T1, and the fifth transistor T3. Specifically, the first transistor Td may be a silicon transistor, and the second transistor T6, the third transistor T4, the fourth transistor T1, and the fifth transistor T3 may be oxide transistors. More specifically, the first transistor Td is a P-type transistor, and the second transistor T6, the third transistor T4, the fourth transistor T1, and the fifth transistor T3 are N-type transistors.

Figure 2C:
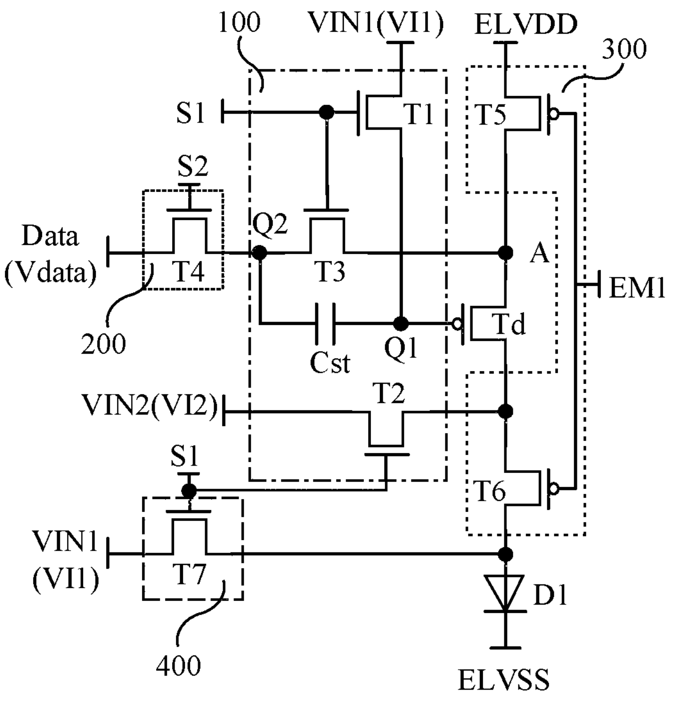
Figure 2D:
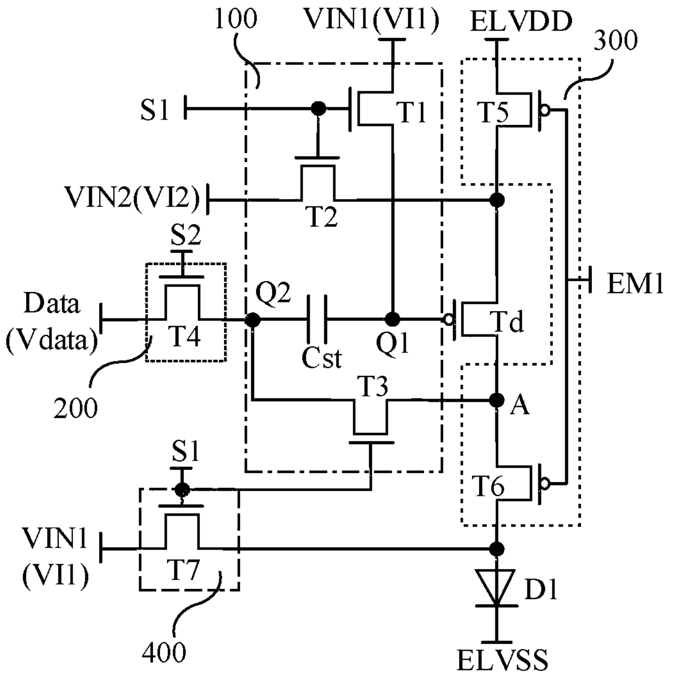

In some embodiment as shown in FIGS. 2C and 2D, the display panel further includes a sixth transistor T2, wherein one of a source or a drain of the sixth transistor T2 is electrically connected between a second reset signal line VIN2 and the other of the source or drain of the first transistor Td, and the second reset signal VIN2 is different from the first reset signal VIN1. The first transistor Td accompanying with the sixth transistor T2 and the storage capacitor Cst is configured to compensate a threshold voltage of the first transistor Td. The display panel is configured to determine a driving frequency that changes according to input image data or a driving mode, and in an initialization phase, for different driving frequencies, provides a first reset signal VI1 with different potentials and a second reset signal VI2 with different potentials.

Figure 2E:
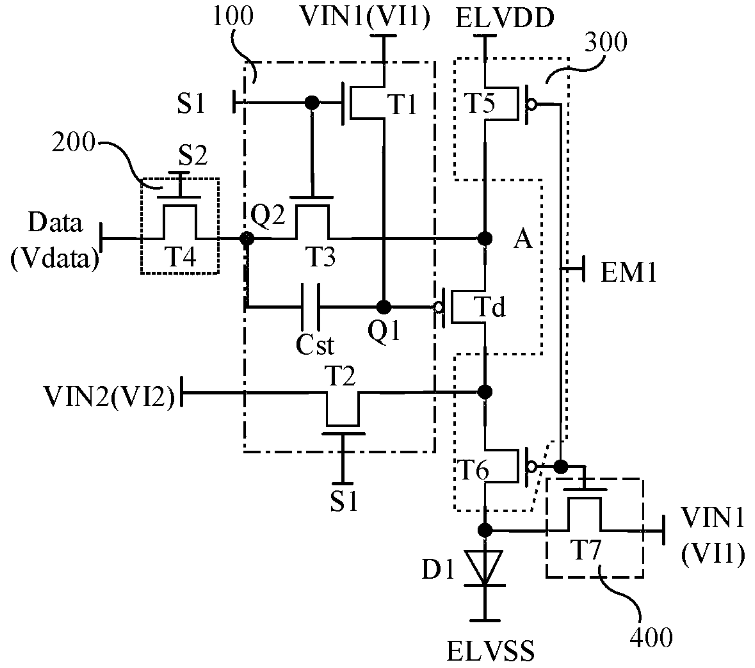
Figure 2F:
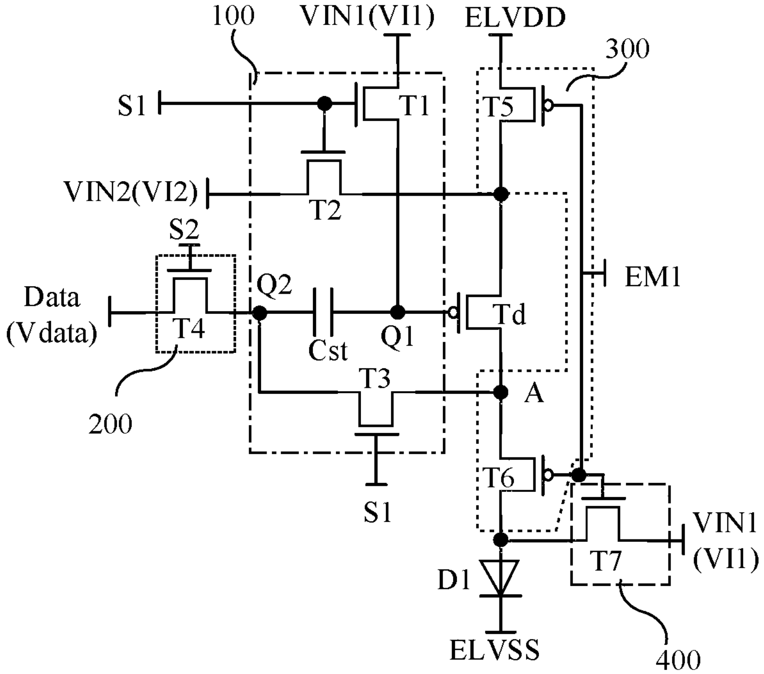

In some embodiment, the display panel further includes a seventh transistor T5, wherein the seventh transistor T5 is electrically connected between the first power supply ELVDD and the first transistor Td, and the seventh transistor T5 and the second transistor T6 are electrically connected to a same first light-emitting control signal line EM1. As shown in FIGS. 2E and 2F, the seventh transistor T5 may be electrically connected to a first light-emitting control signal line EM1, and the second transistor T6 may be electrically connected to a second light-emitting control signal line EM2.

In some embodiment, the display panel further includes an eighth transistor T7, wherein the eighth transistor T7 is electrically connected between the first reset signal line VIN1 and an anode of the light-emitting device D1. The first reset signal VI1 and the second reset signal VI2 are direct current (DC) low-level signals, and a voltage value of the first reset signal VI1 is less than a voltage value of the second reset signal VI2. The first reset signal line VIN1 and the second reset signal line VIN2 are electrically connected to different scanning signal lines S1/S2 respectively, wherein the display panel is configured to determine driving frequencies that change according to input image data or a driving mode, and in an initialization phase, provides scan signals with varying conduction durations for different driving frequencies.

As shown in FIGS. 2C and 2D, one of a source or a drain of the eighth transistor T7 is electrically connected to an anode of the light-emitting device D1, and the eighth transistor T7 is configured to transmit a first reset signal VI1 to the anode of the light-emitting device D1. A type of the eighth transistor T7 is one of an N-type transistor or a P-type transistor, and a type of the fourth transistor T1 and the sixth transistor T2 is the other one of the N-type transistor or the P-type transistor.

The display panel may further include touch electrodes to realize the touch function of the display panel. Further, the display panel also includes sensors to realize functions such as fingerprint recognition, camera, face recognition, distance perception, etc. The sensors include fingerprint recognition sensors, cameras, structured light sensors, time-of-flight sensors, distance sensors, light sensors, etc. Further, the display panel may further include a color filter layer, and the color filter layer may cooperate with the light-emitting device D1 to improve the contrast of the display panel. In addition, the display panel provided with the color filter layer can omit the circular polarizer to reduce the reflection of ambient light.

The descriptions of the above embodiments are only used to help understand the technical solutions and core ideas of the present disclosure; those of ordinary skill in the art should understand that they can still modify the technical solutions recorded in the foregoing embodiments, or modify some of the technologies. The features are equivalently replaced; and these modifications or replacements do not cause the essence of the corresponding technical solutions to deviate from the scope of the technical solutions of the embodiments of the present disclosure.

What is claimed is:

1. A display panel, comprising a pixel driving circuit, wherein the pixel driving circuit comprises:

a first power supply, a second power supply, a first transistor, a second transistor, a storage capacitor, and a light-emitting diode, wherein the first transistor, the second transistor, and the light-emitting device are connected in series between the first power supply and the second power supply;

a third transistor, wherein one of a source or a drain of the third transistor is electrically connected to a data signal line, the other one of the source or the drain of the third transistor is electrically connected to an electrode plate of the storage capacitor, and the other electrode plate of the storage capacitor is electrically connected to a gate of the first transistor; and a fourth transistor, wherein one of a source or a drain of the fourth transistor is electrically connected to a first reset signal line, the other of the source or the drain of the fourth transistor is electrically connected to the other electrode plate of the storage capacitor, a sixth transistor, wherein one of a source or a drain of the sixth transistor is electrically connected between a second reset signal line and the other of the source or drain of the first transistor, and a second reset signal is different from a first reset signal, the first transistor accompanying with the sixth transistor and the storage capacitor is configured to compensate a threshold voltage of the first transistor.

2. The display panel as claimed in claim 1, further comprising:
a fifth transistor electrically connected between the data signal line and one of a source or a drain of the first transistor.

3. The display panel as claimed in claim 2, wherein a type of the first transistor is different from a type of the second transistor, the third transistor, the fourth transistor, and the fifth transistor.

4. The display panel as claimed in claim 2, wherein the first transistor is a silicon transistor, and the second transistor, the third transistor, the fourth transistor, and the fifth transistor are oxide transistors.

5. The display panel as claimed in claim 2, wherein the first transistor is a P-type transistor, and the second transistor, the third transistor, the fourth transistor, and the fifth transistor are N-type transistors.

6. The display panel as claimed in claim 1, wherein the display panel is configured to determine a driving frequency that changes according to input image data or a driving mode, and in an initialization phase, for different driving frequencies, provides a first reset signal with different potentials and a second reset signal with different potentials.

7. The display panel as claimed in claim 1, further comprising:
a seventh transistor, wherein the seventh transistor is electrically connected between the first power supply and the first transistor, and the seventh transistor and the second transistor are electrically connected to a same first light-emitting control signal line.

8. The display panel as claimed in claim 1, further comprising:
a seventh transistor, wherein the seventh transistor is electrically connected between the first power supply and the first transistor, the seventh transistor is electrically connected to a first light-emitting control signal line, and the second transistor is electrically connected to a second light-emitting control signal line.

9. The display panel as claimed in claim 2, further comprising:
an eighth transistor, wherein the eighth transistor is electrically connected between the first reset signal line and an anode of the light-emitting device.

10. The display panel as claimed in claim 9, further comprising:
a sixth transistor, wherein one of a source or a drain of the sixth transistor is electrically connected between a second reset signal line and the other of the source or the drain of the first transistor.

11. The display panel as claimed in claim 10, wherein a first reset signal and a second reset signal are direct current (DC) signals, and a voltage of the first reset signal is less than a voltage value of the second reset signal, wherein the voltage of the first reset signal is lower than a threshold voltage of the fourth transistor, and the voltage of the second reset signal is lower than a threshold voltage of the sixth transistor.

12. The display panel as claimed in claim 10, wherein the first reset signal line and the second reset signal line are electrically connected to different scanning signal lines respectively, wherein the display panel is configured to determine driving frequencies that change according to input image data or a driving mode, and in an initialization phase, provides scan signals with varying conduction durations for different driving frequencies.

13. The display panel as claimed in claim 9, wherein one of a source or a drain of the eighth transistor is electrically connected to an anode of the light-emitting device, and the eighth transistor is configured to transmit a first reset signal to the anode of the light-emitting device,
wherein a type of the eighth transistor is one of an N-type transistor or a P-type transistor, and a type of the fourth transistor and the sixth transistor is the other one of the N-type transistor or the P-type transistor.

* * * * *